United States Patent [19]

Brown

[11] Patent Number: 4,821,917
[45] Date of Patent: Apr. 18, 1989

[54] STORAGE AND DISPENSING MEANS

[75] Inventor: Leonard C. Brown, Warner Beach, South Africa

[73] Assignee: Cornelis Dirk Ferguson, Umkomaas, South Africa

[21] Appl. No.: 55,167

[22] Filed: May 28, 1987

[30] Foreign Application Priority Data

May 30, 1986 [ZA] South Africa ............... 86/4044

[51] Int. Cl.$^4$ .............. A47B 81/00; A47F 1/00
[52] U.S. Cl. .................... 221/69; 221/129; 221/130; 221/131; 221/283; 312/12; 312/18; 312/107.5; 312/216; 211/7
[58] Field of Search ........... 221/129, 130, 124, 125, 221/126, 127, 131, 123, 87, 2, 5, 92, 312, 69, 282, 283; 312/12, 15, 16, 18, 19, 107, 111, 216, 217, 218, 107.5, 10, 333; 206/387; 211/4, 7, 10, 126, 194; 52/36; 248/DIG. 6; 403/298, 397; 70/78, 85

[56] References Cited

U.S. PATENT DOCUMENTS

| 428,941 | 5/1890 | Pauly | 70/85 |
| 535,782 | 3/1895 | Woodruff | 70/85 |
| 1,268,141 | 6/1918 | Nystrom | 312/12 |
| 2,905,926 | 9/1959 | Aid | 186/56 X |
| 3,856,369 | 12/1974 | Commiant | 312/107 |
| 4,024,954 | 5/1977 | Staar | 221/87 X |
| 4,046,255 | 9/1977 | Ackeret | 206/387 |
| 4,598,810 | 7/1986 | Shore et al. | 221/5 X |
| 4,600,107 | 7/1986 | Price et al. | 211/126 X |

FOREIGN PATENT DOCUMENTS

| 408257 | 3/1910 | France | 70/85 |
| 5835773 | 3/1983 | Japan | 206/387 |
| 11797 | 5/1902 | United Kingdom | 312/218 |
| 1410997 | 10/1975 | United Kingdom | 221/5 |

Primary Examiner—Kevin P. Shaver
Assistant Examiner—Stephen B. Parker
Attorney, Agent, or Firm—Bucknam and Archer

[57] ABSTRACT

A storage and dispensing device is provided for use in a tape cassette dispensing machine. The device comprises a bin with side by side sliding compartments, each slidable to extend from one bid side to expose an open compartment side for insertion or removal of a cassette. The bin is mounted by means of two tongues extending from each of the upper and lower bin sides. The tongues extend rearwardly from the upper and lower bin sides. Each tongue has an opening with a slot and a locking rod is inserted into a pair of slots.

14 Claims, 3 Drawing Sheets

STORAGE AND DISPENSING MEANS

BACKGROUND TO THE INVENTION

This invention relates to storage and dispensing means for cassette dispensing machines.

Particularly this invention relates to the means for holding the cassettes in a dispensing machine and for releasing them for access by a user. A wide variety of such means are known, including tilting doors and pivoting doors which open to allow access to a cupboard-like compartment, and carousel-type means by which the tapes are held in a drum magazine.

OBJECT OF THE INVENTION

It is an object of this invention to provide a storage and dispensing means for cassette dispensing machines, which will operate and be effective in as a storage medium.

SUMMARY OF THE INVENTION

In accordance with this invention there is provided storage and dispensing means comprising a bin having a plurality of sliding compartments each arranged to receive a tape cassette side by side therein, the compartments being slidable in their own planes between a closed position within the bin in which the compartment interior is inaccessible for removal of a cassette, and a position extended from a side of the bin in which the compartments are accessible for removal and insertion of a cassette.

A feature of the invention provides for compartments to have a side opening therein which is accessible fo removal and insertion of a cassette when the cassette is in the extended position, and inaccessible when within the bin by reason of the proximity of a sufficiently closed side of an adjoining compartment.

Preferably the side opening is in a major side of the compartment, and the major side opposite the open side has sufficient opening therein to allow a user to push a cassette out of the open side of the compartment from the said opposite side.

There is also provided for each compartment to be retained in its closed position against a biasing force by a locking pin, mounted on the back of the bin, and further for the compartments to have runners extending rearwardly from the upper and lower sides through openings in the back of the bin.

The runners and the upper and lower edges of the compartments may slide between pairs of ridges in the upper and lower bin surface, and the runners have clips on the rear side of the bin arranged for preventing removal of the compartment from the front side of the bin and for determining the extent of extension of the compartments out of the bin.

Further, preferably the compartments have openings in their rear sides arranged to allow access between cassette recognition means at the bin rear and a cassette in a compartment in use, and the compartments have formations arranged to locate a cassette in a predetermined position therein.

A locking pin may be provided to be operable to extend into and retract from a co-operating hole in a runner of the compartment. The locking pin preferably is part of a solenoid, and the rear of the pin is arranged to activate a signalling switch when in a retracted position.

The biasing means for each compartment may be a leaf spring mounted on the inside rear surface of the bin in the length of the compartment and arranged to react against the rear side of the compartment.

Preferably the compartment is of transparent material.

The bin may have an electronics printed circuit board mounted on its outside rear surface, carrying electronic circuiting for operating each locking pin on the bin.

A particular feature of the invention provides for the bin to have mounting formations extending rearwardly from the upper and lower bin sides, and being arranged to mount the bin in a housing framework of the tape cassette dispensing machine.

The mounting formations are two tongues extending from each of the upper and lower bin sides forming two pairs of tongues operatively one above the other, each tongue having an opening through it with a slot extending from the opening through the rear edge.

For mounting the bin in a framework, there is provided a locking rod for each pair of mounting tongues, each rod having two spaced apart thickened portions and being arranged to allow the narrow portion to be transversely insertable into the openings of a pair through the slots and being slidable to have the thickened portion within the opening in which position the slots are too narrow to allow transverse withdrawal through the slots.

The invention extends to a tape cassette dispensing machine comprising a framework fitted with rows and columns of storage and dispensing means as defined above, there being a locking rod for each column of bins.

BRIEF DESCRIPTION OF THE DRAWINGS

A preferred embodiment of the invention is described below by way of example only, and with reference to the accompanying drawings, in which.

DETAILED DESCRIPTION OF THE DRAWINGS

Figure 1:
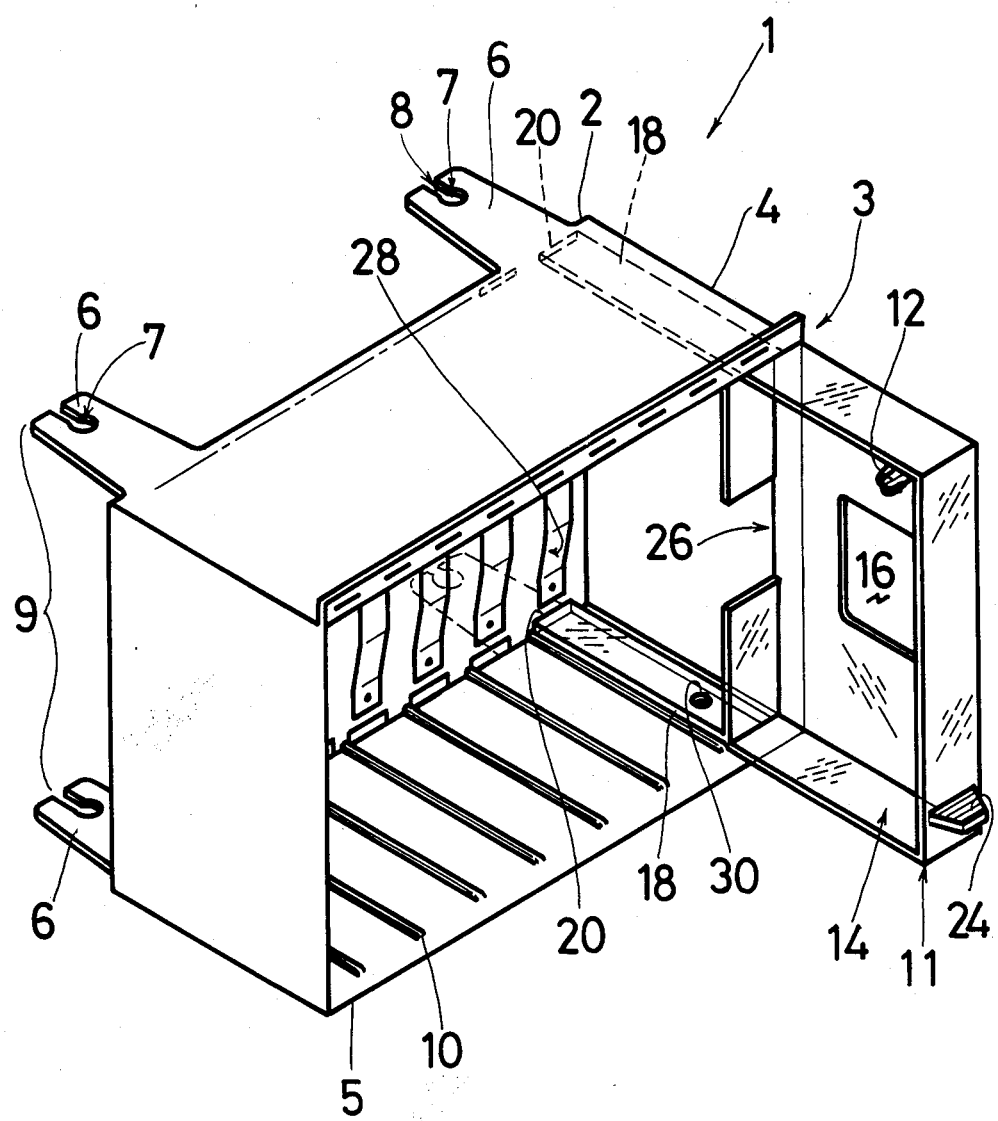
FIG. 1 is an isometric view of a bin and compartment according to the invention.
Figure 2:
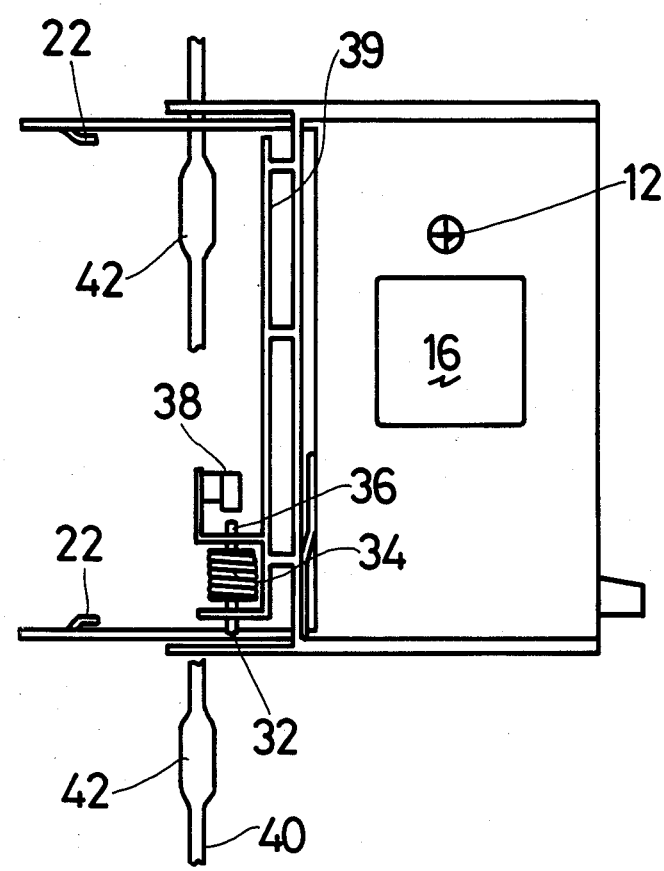
FIG. 2 is a side view of the embodiment of FIG. 1.

Referring to FIGS. 1 and 2, a bin (1) is rectangular in shape having two opposite major sides with one being a rear side (2) and the other a front side (3) which is open. The top and bottom sides (4) and (5) of the bin each have two rearwardly projecting co-planar tongues (6), with openings (7) therein with slots (8) running from the openings to the rearmost edges of the tongues. The tongues form two vertically aligned upper and lower pairs (9).

The bin has spaced apart ribs (10) on the inside upper and lower surfaces to act as guides for receiving slidable compartments (11) in side-by-side manner along the length of the bin.

Each compartment (11) is rectangular and of a size that will enable it to receive a video tape cassette (not shown) neatly therein with a pin (12) locating one of the spools of the tape. The compartment is of clear plastics material, having one major side (14) open and having a central opening (16) in the other major side which carries the pin (12). Top and bottom runners (18) are provided on the compartment (11), and these extend rearwardly from and co-planarly with the top and bottom ends of the compartment, and pass through slots (20) in the top and bottom of the rear of the bin, to enable the cassette compartment to slide in and out of the bin between the spaced apart guide ribs (10) with the runners (18) still retained within their slots (20). The runners (18) are provided with clip formations (22) to prevent the compartment from being withdrawn completely from the bin. A suitable handle (24) is provided on the front edge of the compartment, and an opening (26) is provided in the central portion of the rear edge of the compartment, to allow for electronic interaction between means for recognising the presence of a cassette, and the cassette itself when located in the compartment. A wide variety of such means are known in the art.

A leaf spring (28) is located at the rear of the bin opposite the position and in the length of each of the compartments, so that a compartment can be slid closed against the spring biasing (28), to have its front edge flush with the bin. A solenoid pin hole (30) in the bottom runner of each is engagable by a solenoid pin (32) (FIG. 2) moving under force of gravity, as the compartment is pushed closed. The compartment is thus locked in the closed position inside the bin. The solenoid pin (32) runs through the length of a solenoid (34), and when the solenoid is activated to retract the pin upwardly it releases the compartment under spring biasing to slide out of the bin. Simultaneously the top end (36) of the retracted pin operates a microswitch (38), to provide a feedback electrical signal to the dispensing machine control means indicating that release of the particular compartment has taken place. The microswitch (38) is mounted to a printed circuit board (39) fitted against the outside rear of the bin.

Locking rods (40) are provided and they pass through the openings (7) of each pair (9) of top and bottom tongues (6), and have outwardly stepped diametrical sections (42) which fit neatly within the openings (7) of each pair, but which are too large to slide transversely out of the slots (8). Thus when the rods are shifted axially to have the thinner portion of the rods located in the opening (7), the bin can be transversely retracted from any cabinet holding it, with the rods sliding out of the slots (8).

A cassette can be located inside the compartment quite conveniently through the open major side thereof, and removed by pushing a finger through the central opening (16) in the opposite compartment side, to push the cassette out through the opposite open side. The compartment is conveniently slid into the bin whether empty or closed, to have the solenoid pin lock under gravity in the pin opening. It will be appreciated that when the bin is fully fitted with compartments (11), no access to the compartment contents is possible.

Preferably the compartment upper and lower edges are tapered towards each other very slightly from front to rear to facilitate the slidability within the bin.

Figure 3:
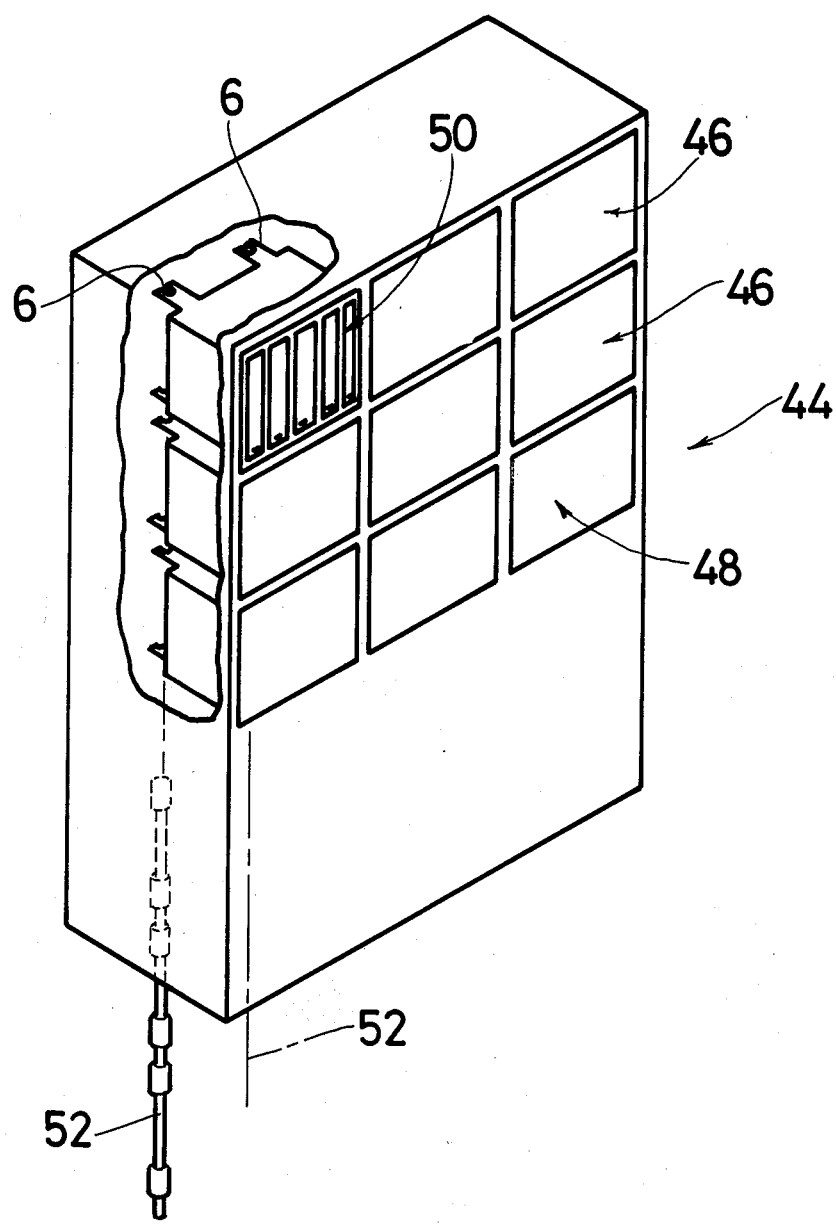
FIG. 3 is an isometric view of a tape cassette dispensing machine fitted with the embodiment of FIGS. 1 and 2.

Referring to FIG. 3, a cabinet (44) of a video cassette dispensing machine is shown. The cabinet comprises a rectangular box framework providing housing for rows (46) and columns (48) of bins (50) as described with reference to FIGS. 1 and 2. The bins slide into each box frame and bins of a column are retained in position by locking rods (52) running the height of the cabinet. Thus each bin of a column is freed or locked by axially sliding the rods of that column to the appropriate position as described with reference to FIGS. 1 and 2.

It is considered that the invention provides a simple and compact storage and dispensing means.

What is claimed is:

1. Storage and dispensing device for a plurality of tape cassettes in a tape cassette dispensing machine comprising a housing; at least one bin (1) having a plurality of sliding compartments (11) arranged to receive tape cassettes side by side therein with one tape cassette in each sliding compartment, the compartments being arranged to be slidable in their own planes between a closed position within the bin in which the compartment interior is inaccessible for removal of a cassette, and a position extended from a side of the bin in which the compartments are accessible for removal and inserting of a cassette; bin mounting formations including two tongues extending from each of the upper and lower bin sides and extending rearwardly from the upper and lower bin sides, to form two pairs of tongues operatively one above the other, each tongue having an opening therein with a slot extending from the opening through the rear edge, a locking rod for each pair having two spaced apart thickened portions and being arranged to be transversely insertable into the openings of a pair through the slots and being slidable to have the thickened portions within the openings in which position the slots are too narrow to allow transverse withdrawal through the slots, said bin mounting formations and said locking rod cooperating so as to mount said bin in said housing.

2. Storage and dispensing device as claimed in claim 1 in which compartments have a side opening therein which is accessible for removal and insertion of a cassette when the cassette is in the extended position, and inaccessible when within the bin by reason of the proximity of a sufficiently closed side of an adjoining compartment.

3. Storage and dispensing device as claimed in claim 2 in which the side opening is in a major side of the compartment.

4. Storage and dispensing device as claimed in claim 3 in which the major side opposite the open side has an opening therein to allow a user to push a cassette out of the open side of the compartment from the opposite side.

5. Storage and dispensing device as claimed in claim 4 in which each compartment is retained in its closed position against a biasing force by a locking pin, mounted on the back of the bin.

6. Storage and dispensing device as claimed in claim 5 in which the compartments have runners extending rearwardly from the upper and lower sides.

7. Storage and dispensing device as claimed in claim 6 in which the runners and upper and lower edges slide between pairs of ridges in the upper and lower bin surface, and the runners have clips on the rear side of the bin arranged for preventing removal of the compartment from the front side of the bin and for determining the extent of extension of the compartments out of the bin.

8. Storage and dispensing device as claimed in claim 1 in which the compartments have openings in their rear sides arranged to allow access between a cassette recognition means at the bin rear and a cassette in a compartment in use.

9. Storage and dispensing device as claimed in claim 1 in which the compartments have formations arranged to locate a cassette in a predetermined position therein.

10. Storage and dispensing device as claimed in claim 6 in which the locking pin is operable to extend into and retract from a co-operating hole in one of the runners of the compartment.

11. Storage and dispensing device as claimed in claim 10 in which the locking pin is part of a solenoid, and the rear of the pin is arranged to activate a signalling switch when in retracted position.

12. Storage and dispensing device as claimed in claim 5 in which the biasing means for each compartment is a leaf spring mounted on the inside rear surface of the bin in the length of the compartment and arranged to react against the rear side of the compartment.

13. Storage and dispensing device as claimed in claim 1 in which the compartments are of transparent material.

14. A storage and dispensing device according to claim 1 wherein said at least one bin is a plurality of rows and columns of bins and wherein each locking rod locks one column.

* * * * *